United States Patent [19]

Ueki et al.

[11] Patent Number: 4,898,207

[45] Date of Patent: Feb. 6, 1990

[54] OIL RELIEF VALVE FOR LUBRICATION SYSTEMS FOR INTERNAL COMBUSTION ENGINES

[75] Inventors: Noriyuki Ueki, Kakogawa; Shigeru Nishimura, Kobe, both of Japan

[73] Assignee: Kawasaki Jukogyo Kabushiki Kaisha, Japan

[21] Appl. No.: 294,671

[22] Filed: Jan. 9, 1989

[51] Int. Cl.$^4$ .............................................. F01M 1/00
[52] U.S. Cl. .................... 137/539; 137/529; 123/196 R; 123/196 CP; 184/6
[58] Field of Search ................. 137/529, 539; 123/196 R, 196 CP; 184/6.5, 6

[56] References Cited

U.S. PATENT DOCUMENTS

| | | | |
|---|---|---|---|
| 619,705 | 2/1899 | Knupp | 137/539 |
| 731,218 | 6/1903 | Perkins | 137/529 |
| 2,761,468 | 9/1956 | Thatcher | 137/539 |
| 3,130,748 | 4/1964 | Weingärtner | 137/529 X |
| 3,485,324 | 12/1969 | Novak | 123/196 R X |
| 3,862,751 | 1/1975 | Schwaller | 137/529 X |
| 4,171,712 | 10/1979 | DeForrest | 137/529 X |
| 4,462,350 | 7/1984 | Kurata | 123/196 CP |
| 4,616,610 | 10/1986 | Ishida | 123/196 R X |

FOREIGN PATENT DOCUMENTS 0268520  5/1988  European Pat. Off. ............ 137/539

*Primary Examiner*—John Rivell
*Attorney, Agent, or Firm*—Eric P. Schellin

[57] ABSTRACT

An oil relief valve for lubrication systems for internal combustion engines comprising a valve body having a hollow cylindrical shape, a valve seat provided at a bottom end of the valve body, a valve plug placed in the seat, a port bored in the seat to bring the oil relief valve into fluid communication with a lubrication line which supplies oil from an oil pump to various engine parts to be lubricated, a spring mounted on top of the valve plug and adapted to urge the plug against the seat to close the port, and slits cut in the valve body and provided to bring the valve in fluid communication with an oil pan. The spring has a free length smaller than the distance of the space defined between the valve plug and the top end of the valve body.

3 Claims, 2 Drawing Sheets

OIL RELIEF VALVE FOR LUBRICATION SYSTEMS FOR INTERNAL COMBUSTION ENGINES

BACKGROUND OF THE INVENTION (1) Field of the Invention

The present invention relates in general to an oil relief valve for internal combustion engines, and, more particularly, to such a valve which permits the escape of oil in an engine lubricant line when oil pressure rises.

(2) Description of the Prior Art

The use of oil relief valves are well known in lubrication systems for four-stroke cycle internal combustion engines in which the valve allows the escape of oil into an oil pan when internal oil pressure reaches a set level so as to maintain the system at constant pressure. When internal oil pressure is below the set level, the valve has its valve plug to rest on the valve seat sealing the port that is in communication with the oil pan. With the valve in this position, the oil or lubricant is allowed to circulate through the lubricant line between the oil pump and the various engine parts to be lubricated. When the oil pressure reaches the level, the valve plug lifts itself up from the seat to open the port bringing the line into communication with the oil pan. As a result, portion a of the lubricant is caused to escape into the oil pan and the internal pressure begins to drop. When the oil pressure drops to the level, the valve plug, which is normally urged toward the seat by the action of the spring, is forced down to close the port.

However, those conventional oil relief valves have proved to pose noise problems because of their very design. Each time the system pressure rises and reaches a set level, the valve plug pops up in quick response opening the port to permit the escape of oil into the oil pan, which follows an immediate pressure drop in the system. The increased force of the spring now compressed by the plug will react to this pressure drop and drives the plug down to the seat. With the closure of the port, the system again begins to increase pressure to the level. As a result, the plug is caused to move up again. In this way, the valve plug pops up and down in a rapid succession bringing about a vibration problem generally called "chattering", the rapidly repeated collision of a valve plug against its seat, with a resultant premature wear in the valve seat.

Examples of the prior art oil relief valves for internal combustion engines are disclosed in laid open Japanese patent applications 62-20655 and 58-137809.

SUMMARY OF THE INVENTION

The present invention has been proposed to eliminate the above problems.

It is therefore a primary object of the present invention to provide an oil relief valve for lubrication lines for internal combustion engines which is free from chattering and premature wear in its valve seat due to constant collision with the valve plug in action in response to system pressure change.

It is an additional object of the present invention to provide such an oil relief valve which facilitates the mounting of a valve plug in assembling.

DETAILED DESCRIPTION OF PREFERRED EMBODIMENTS

Figure 1:
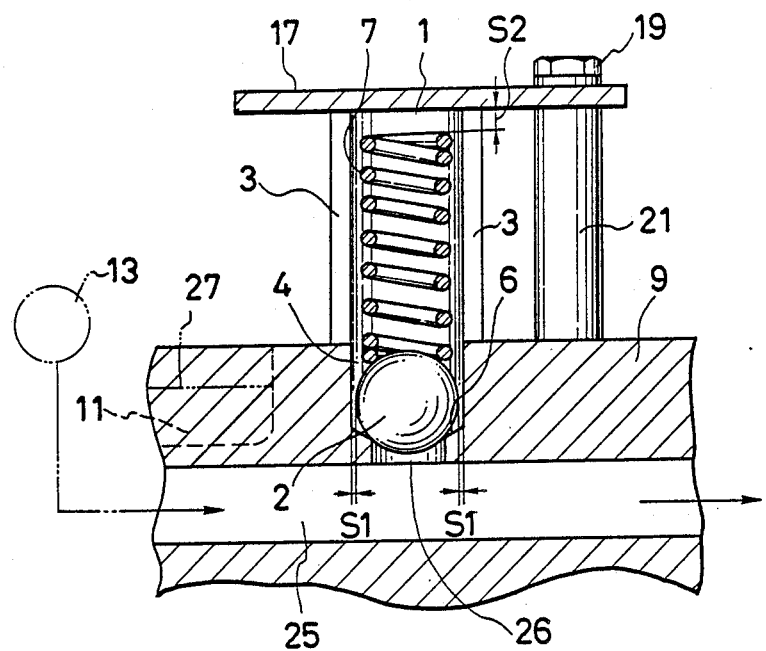
FIG. 1 is a cross-sectional view of a preferred embodiment of the oil relief valve for internal combustion engines constructed in accordance with the present invention.
Figure 2:
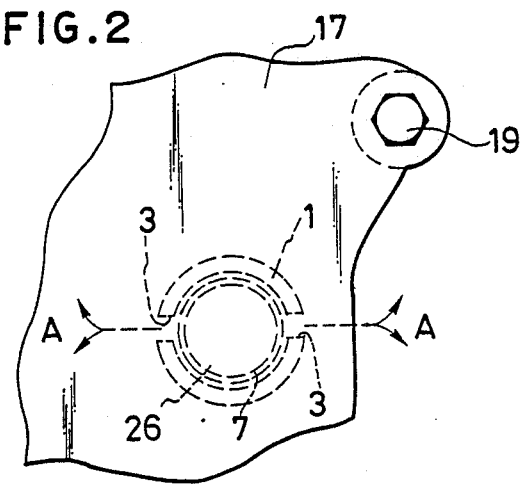
FIG. 2 is a plan view of the embodiment of FIG. 1.

The preferred embodiment of the present invention will be described in full detail in conjunction with the accompanying drawings.

Referring to the drawings, the general functions of the lubricant system for internal combustion engines will be described. An oil pan 11 is provided below an engine, not shown, with which the oil pan may be made integral.

Adjacent to the oil pan 11 is mounted an oil pump 13 to supply lubricating oil to the engine. In operation, the oil pump 13 supplies lubricant at a desired pressure level to a crankshaft, cylinders and a cylinder head in the engine so as to prevent seizure in the rotating portions of the crankshaft and in the sliding surfaces of pistons and cylinder bores in the cylinders.

The lubricant is caused to flow through these engine moving parts, with part of it being allowed to fall on its own weight and collected in the oil pan 11 where the lubricant, which was heated by friction in its in contact with the moving parts, is cooled and passed through a filter, not shown, that is installed in the oil pan 11 in order to remove the contaminants that might be mixed in the oil. After the filter, the lubricant is sucked through an inlet port into the oil pump 13 which supplies it in pressurized state into a lubricant line, not shown, that is connected to the engine. This procedure is repeated to keep the crankshaft, the cylinders and cylinder head in lubricated conditions.

Referring first to FIG. 1, an oil relief valve constructed in accordance with a preferred embodiment of the present invention, is shown. The oil pan 11 may be provided below the engine, which may form part of the crankcase 9. A lubrication passage 25 is provided to interconnect the oil pump 13 and the engine. The oil relief valve comprises an axially extending valve chamber 4, an oil port 26 that is bored below the chamber, a valve plug and a valve seat 6. The lubrication passage 25 is in fluid communication with the oil pan 11 through the chamber 4 when the port 26 is opened by the valve plug 2 lifting up from the seat 6. The seat 6 is concaved so as to fittingly receive therein the valve plug 2 thereby effectively seal the port 26. In this embodiment, the valve plug 2 is a steel ball.

The chamber 4 may merge a lower end of a sleeve member 1 of the substantially same diameter as the chamber, which may preferably be coaxial with the chamber 4. The sleeve 1 may be made integral with the crankcase 9. A pair of longitudinal slits 3 may preferably be provided in the sleeve 1 to bring the chamber 4 in fluid communication with the oil pan 11. Each slit 3 has its lower end located at a point above the oil level 27 in the oil pan 11 for the reason which will later be described. The valve plug 2 is so formed and sized as to define an annular clearance S1 around the plug in the chamber 4, between the outer periphery of the largest diameter of the plug 2 and the inner wall surface of the chamber 4. Also, the oil relief valve has a coil spring 7 in the sleeve 1. The spring 7 is placed on top of the valve plug 2 in such a manner to urge the plug against the seat 6. A cover member 17 is provide to top the sleeve 1. The cover member 17 may preferably be secured with a bolt 19 to a boss 21 that may be formed integrally with the crankcase 9. The spring 7 may preferably have a predetermined free length smaller than the distance in the sleeve between the valve plug 2 and the cover member 17. Thus, without the valve plug 2 lifting up from the seat 6, the spring rests on the plug leaving a space S2 at its top, between the uppermost end of the spring and the bottom surface of the cover member 17.

In an alternative embodiment, the oil relief valve may have a cover member 17 that is made integral with a cover member for the oil pump 13.

Figure 3:
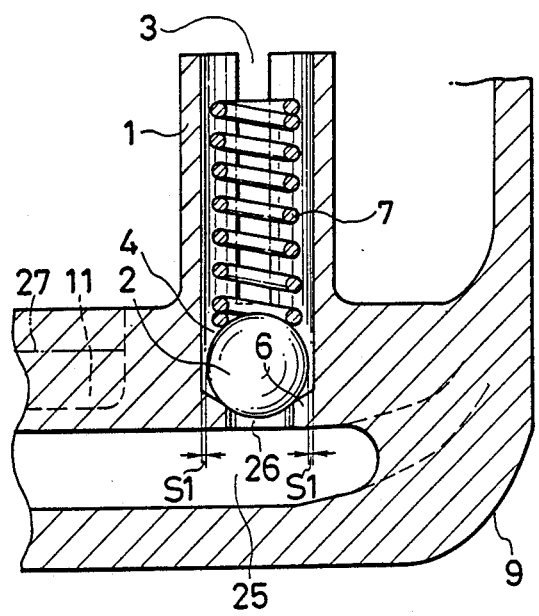
FIG. 3 is a cross-sectional view of a second embodiment of the invention, with its cover member being removed.

Referring then to FIG. 3, the oil relief valve is shown to have a longitudinal slit 3 cut in the sleeve member 1. The slit 3 is so formed that the passage of oil from the lubrication system 25 into the oil pan 11 depends on the position of the valve plug 2 in the sleeve member 1 that the plug takes in its vertical movement in response to pressure difference between the passage 25 and the chamber 4.

Since the construction of the oil relief valve in accordance with the present invention has been described, the operation of the valve will be explained in detail, referring mainly to FIGS. 1 and 3.

With the above-mentioned arrangement, when the lubrication system in operation is below the set pressure level, with a minimum difference in pressure between the lubrication passage 25 and the chamber 4, the valve plug 2 poises itself at a position slightly lifted up from the seat 6, the equilibrated position that is determined by the difference in pressure between the lubrication passage 25 and the chamber 4. With the valve plug 2 in this position, a minimum spill of oil is permitted from the lubrication passage 25 into the oil pan 11 via the slits 3 through the clearance S1.

When the lubrication system 25 increases in internal pressure, but to a magnitude still below the set level, the flow of oil through the clearance S1 will increase, with no or little further lifting-up of the valve plug 2, since the pressure in the lubrication passage 25 is not large enough to overcome the force of the spring 7.

Figure 4:
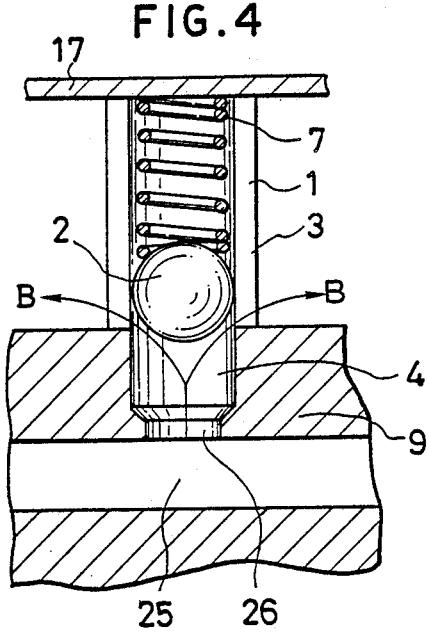
FIG. 4 is an explanatory view of the oil relief valve of FIG. 1 showing its operation.

If the pressure in the lubrication system 25 rises further and reaches the set level, the valve plug 2 will overcome the force of the spring 7 and move up, as shown in FIG. 4, from the seat 6 in the sleeve member 1 to a fully open position allowing the escape of oil from the passage 25 into the oil pan 11 following the arrows B in the figure.

While the pressure below the port 26 continues to be large enough to overcome the force of the coil spring 7, the flow of lubricant from the passage 25 to the oil pan 11 through the port 26 is maintained. When the pressure of the lubrication passage 25 drops below the set level, the valve plug 2 sinks in the sleeve member 1 to an equilibrated position that is determined by the pressure difference across the port 26.

As described above, regardless of the change in pressure difference between the lubrication passage 25 and chamber 4 in the oil relief valve, the valve plug 2 is prevented from physical contact with the seat 6. Thus, no or little vibration and resultant noise occur due to chattering. Because of this, wear of the valve seat would be prevented. It will be appreciated that the present invention will contribute to enhancing the performance of the oil relief valve.

What is claimed is:

1. An oil relief valve for a lubrication system for internal combustion engines, the system being of a type which has an oil line mounted in a bottom side of a crankcase, comprising a port bored in the bottom side of a valve chamber, a valve seat provided at an exit end of the port, said valve chamber extending upwardly from and connected to an upper end of the seat, the chamber having an inner circumferential surface, a vertically elongate sleeve member having a circular cross section and extending upwardly from the chamber, the sleeve member having an inner circumferential surface merged with the inner surface of the chamber, vertical slits cut in the sleeve member, a valve plug mounted in the sleeve member and adapted to move along the inner circumferential surface of the sleeve member, and a coil spring mounted in a space defined in the sleeve member between the valve plug and a top portion of the sleeve, the spring having a free length smaller than the longitudinal distance of the space.

2. An oil relief valve as set forth in claim 1, wherein the valve plug is a ball.

3. An oil relief valve as set forth in claim 1, wherein the slits are each provided with an opening which permits the escape of oil into the oil pan when the valve plug is lifted up.

* * * * *